May 31, 1955 L. C. MILLER 2,709,446
CONTROL VALVE FOR PORTABLE TOOL
Filed Feb. 23, 1952 3 Sheets-Sheet 1

LEONIDAS C. MILLER,
INVENTOR.

BY Lyon & Lyon
ATTORNEYS

May 31, 1955  L. C. MILLER  2,709,446
CONTROL VALVE FOR PORTABLE TOOL
Filed Feb. 23, 1952  3 Sheets-Sheet 2

LEONIDAS C. MILLER,
INVENTOR.

BY Lyon & Lyon
ATTORNEYS

May 31, 1955  L. C. MILLER  2,709,446
CONTROL VALVE FOR PORTABLE TOOL
Filed Feb. 23, 1952  3 Sheets-Sheet 3

LEONIDAS C. MILLER,
INVENTOR.

BY Lyon & Lyon
ATTORNEYS

United States Patent Office 2,709,446
Patented May 31, 1955

2,709,446

CONTROL VALVE FOR PORTABLE TOOL

Leonidas C. Miller, Los Angeles, Calif.

Application February 23, 1952, Serial No. 272,956

5 Claims. (Cl. 137—270)

This invention relates to a control valve for a portable tool. This application is a continuation-in-part of my copending application, Serial No. 667,320, filed May 4, 1946, now Patent No. 2,612,140 entitled "Fluid Driven Actuator for Tools."

The principal object of the present invention is to provide a novel form of control valve for a power cylinder or actuator for a tool.

A related object is to provide a control valve of this type which is shaped as a manually graspable handle and which is readily operable irrespective of the orientation of the power cylinder or actuator in service.

Another object is to provide a valve assembly having internal movable parts which may be assembled into either end of a valve housing so that the working force applied to the power cylinder may occur on the push stroke or pull stroke as desired.

Another object is to provide a valve assembly including a split shell shaped to provide a manually graspable handle, the valve body being receivable within a cavity in the shell in either of two positions so that an operating lever pivoted to the shell may engage a projecting end of the valve plunger when it projects from either end of the valve housing.

Other related and more detailed objects and advantages will appear hereinafter.

Figure 1:
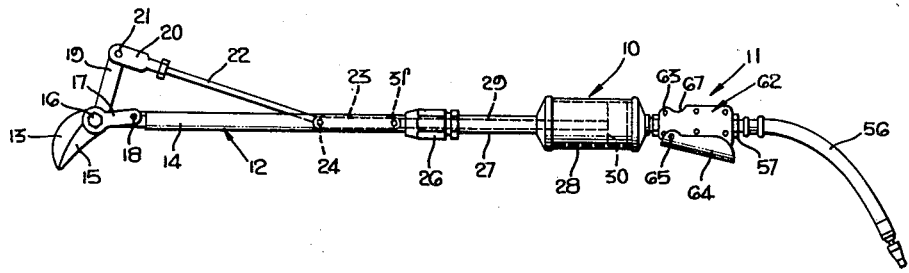
Figure 1 is a side elevation showing a power operated portable pruning tool and showing a control valve assembly embodying my invention.

Referring to the drawings, the fluid driven actuator generally designated 10 will be described in connection with a power operated pruning shear, but it is to be understood that this embodiment of my invention is set out only for purposes of illustration. It is contemplated that the fluid driven actuator employed in connection with the pruning shear will be particularly useful for other power driven devices operated by reciprocating motion. Furthermore, the pressure fluid used for operating the device will be described as air under pressure although it is recognized that any other pressure fluid, either a gas or a liquid, may be used with good results.

The actuator assembly 10 which may be pneumatically driven as set forth above is operatively positioned between a valve assembly 11 and a pruning shear assembly generally designated 12. The pruning shear assembly 12 preferably comprises a stationary blade 13 secured to the end of a slotted tubular support 14. A movable blade 15 is pivotally connected to the stationary blade 13 by means of a pivot bolt 16. Means are provided for preventing turning movement of the bolt 16 under the influence of the moving blade 15, and as shown in Figure 1 this means may include a small box wrench 17 having its outer end secured to the stationary blade by means of a fastener element 18. A crank arm 19 formed integrally with the movable blade 15 is pivotally connected to a clevis 20 by means of a pin 21. An actuating arm 22 is threadedly connected with the clevis 20 at one end and at the other end is pivotally connected to a link 23 by a pivot pin 24. The actuating arm 22 extends through a slot formed in the wall of the tubular support 14. The link 23 is preferably circular in cross-section and is slidably received within the bore of the tubular member 14. The link therefore serves as a cross-head for operating the arm 22.

A threaded connection fitting 26 serves to attach the tube 14 to the stationary sleeve 27 which projects forwardly from the power cylinder 28. A piston rod 29 is connected to the piston 30 at one end and is connected at the other end to the link 23 by means of the pin 31. From this description it will be understood that reciprocation of the piston 30 within the cylinder 28 results in oscillatory movement of the blade 15 of the pruning shear assembly 12.

The valve assembly 11 controls operation of the piston 30 within the cylinder 28. As shown and described in my copending application, Serial No. 667,320, referred to above, the valve assembly 11 is provided with a terminal connection fitting 32 which is externally threaded at 33 for reception in the internally threaded bushing 34 fixed at one end of the cylinder 28. The terminal connection fitting 32 is provided with two passageways 35 and 36. The passageway 35 communicates with the interior of an axially extending spear tube 37 fixed to the fitting 32. This spear tube 37 extends into the hollow piston rod 29. The spear tube is closed at its projecting end, and lateral ports in the spear tube and piston rod establish communication between the interior of the spear tube 37 and the interior of the cylinder on the left side of the piston 30 as viewed in Figure 1. The passageway 36 in the terminal fitting 32 communicates with the cylinder 28 on the other side of the piston 30. The tapered surface 37a on the terminal fitting 32 seats within the correspondingly tapered socket 38 on the bushing 34 to form a metal-to-metal seal. The construction and arrangement of the interfitting spear tube and hollow piston rod are set forth in detail in said copending application, Serial No. 667,320.

Figure 2:
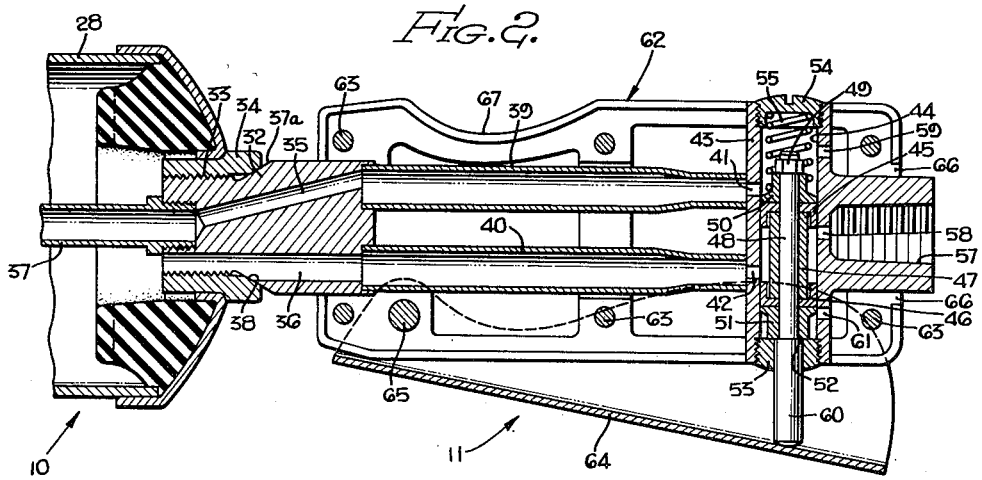
Figure 2 is a sectional elevation on an enlarged scale showing details of the control valve assembly illustrated in Figure 1.

In accordance with the present invention the control valve assembly 11 includes a pair of longitudinally extending tubes 39 and 40 communicating with the passageways 35 and 36 respectively in the terminal connection fitting 32, and with the ports 41 and 42 respectively formed in the wall of the valve housing 43. A transverse cylindrical bore 44 in the housing 43 is adapted to receive axially spaced sealing cups 45 and 46. A spacer sleeve 47 maintains the sealing cups 45 and 46 in axially spaced relationship on the axial valve stem or plunger 48. A nut 49 threaded on one end of the valve stem 48 cooperates with the spacers 50 and 51 to clamp the cups 45 and 46 between the nut 49 and the shoulder 52 on the valve stem. A guide bushing 53 is threaded into one end of the cylindrical bore 44 and a cap element 54 is threaded into the other end of the bore 44. A coil spring 55 is confined between the cap element and the spacer 50 and normally acts to maintain the valve stem in the position shown in Figure 2, in which the spacer 51 is in contact with the guide bushing 53. In such position air admitted through the hose 56 and into the air inlet fitting 57 passes through the inlet port 58 in the wall of the housing 43 and into the bore 44. The air then passes through the port 42 and into the tube 40 for admission into the cylinder 28 by way of the passageway 36. As the piston 30 moves to the front end of the power cylinder 28 by reason of the air pressure pushing it, the air within the power cylinder and in front of the moving piston is exhausted by passing out through the spear tube 37. The air thus being discharged passes outwardly through the passageway 35, tube 39, port 41 and into the bore 44 of the valve housing 43 between the sealing cup 45 and the cap 54. The air is then exhausted to the atmosphere through the vent 59. The vent channels 66 in the handle 62 provide communication between the atmosphere and the interior of the handle 62.

The projecting portion 60 of the valve stem or plunger 48 may be moved inwardly until the end of the valve plunger 48 strikes the cap 54 as a stop element. In this latter position (not shown) the air inlet port 58 communicates with port 41, while port 42 is placed in communication with the vent 61. The air serves to drive the piston 30 towards the rear of the power cylinder 28, thereby exhausting air through the passageway 36, tube 40, port 42 and vent 61.

Handle means are provided for convenient manual gripping of the device and for convenient actuation of the valve stem or plunger 48. This means may include a split molded handle 62 formed of two complementary halves adapted to enclose the tubes 39 and 40 and the valve housing 43. Fastener elements 63 may be provided for maintaining the halves of the handle 62 in assembled relation. A lever 64 of rounded shape conforming to the contour of the hand is pivotally connected to the handle 62 at 65. The proportions of the parts are such that the handle 62 and the lever 64 may be grasped in one hand, and upon squeezing motion of the hand the lever 64 pivots about the pin 65 to move the projecting end 60 of the valve plunger 48 toward the cap 54. Such action results in changing the communication of the ports in the manner just described.

Figure 3:
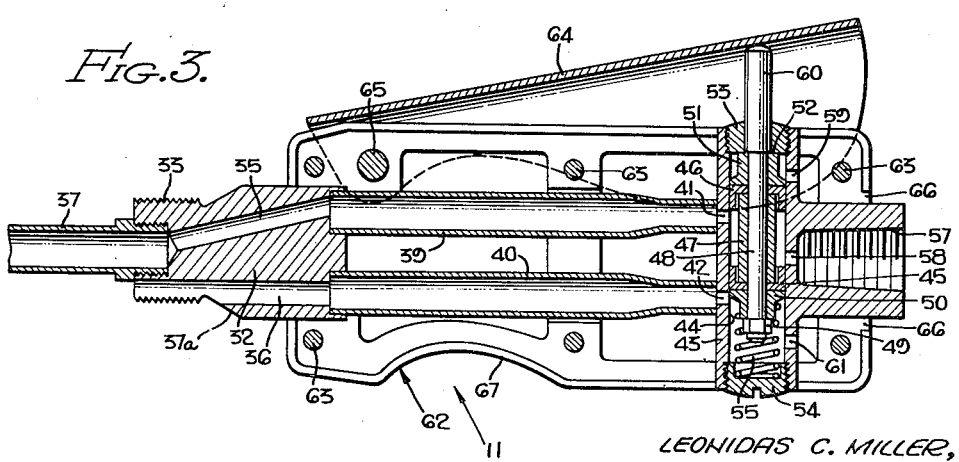
Figure 3 is a sectional elevation similar to Figure 2 showing the movable valve parts assembled in reverse position and showing the split shell and operating lever mounted in corresponding position.
Figure 4:
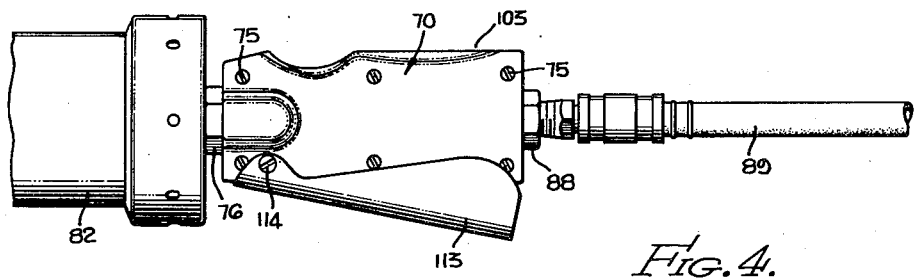
Figure 4 is a side elevation partly broken away showing a modified form of a control valve assembly embodying my invention.
Figure 5:
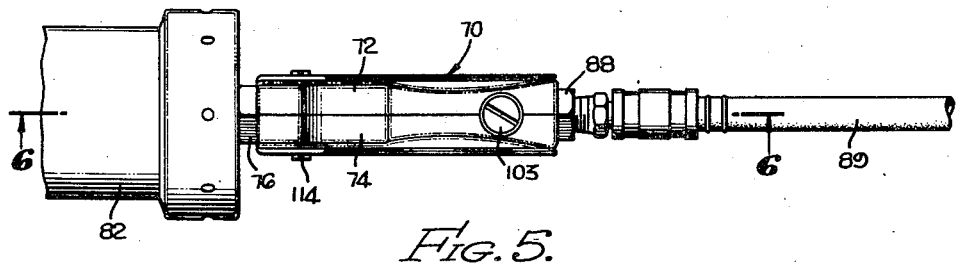
Figure 5 is a plan view of the device shown in Figure 4.

The bore 44 of the valve housing 43, and the guide bushing 53 and cap 54 are so proportioned that the moving parts of the valve assembly may be inserted into the opposite end of the bore 44. Such an arrangement is shown in Figure 3. The coil spring 55 then normally maintains the parts in such position that the inlet port 58 communicates with the port 41 while the port 42 is in communication with the vent 61. The split handle 62 may also be reversed in its position to enable the lever 64 to coact with the projecting end 60 of the valve stem 48. The reversal of the operating parts of the valve 11 provides a construction in which the piston 30 remains at the rear end of the power cylinder 28 until the valve is actuated. In other words, the blades 13 and 15 of the shear assembly 12 may be held normally open, or normally closed, by inserting the operating parts of the valve into the alternate ends of the bore 44.

The halves of the handle 62 are preferably provided with curved indented portions 67 which cooperate to form a recess for reception of the index and middle finger of the hand. The palm of the hand normally receives the curved actuating lever 64. The shape of the handle and operating lever 64 is such as to minimize the possibility of punching parts of the hand during operation of the lever 64.

In the modified form of my invention shown in Figures 4–11 the valve handle 70 is similar in many respects to the valve handle 62 previously described but contains certain refinements. A tongue 71 on the handle section 72 is received within a corresponding groove 73 provided in the handle section 74. This tongue and groove relationship improves the connection between the handle sections. Bolts 75 clamp the handle sections together. The valve body includes the terminal connection fitting 76, the longitudinal tubes 77 and 78, and the transverse valve housing 79. This valve body is received within the central cavity 80 defined within the interior of the handle 70. The terminal connection fitting 76 is secured to the end wall 81 of the power cylinder 82 and the details of this connection are substantially the same as previously described. The piston 83 is connected to the hollow piston rod 84 and is reciprocated within the cylinder 82 by means of air under pressure admitted on alternate sides of the piston. The spear tube 85 is attached to the terminal fitting 76 and projects into the interior of the hollow piston rod 84 as described above.

A reenforcing rib 86 extends from the terminal connection fitting 76 to the valve housing 79 and the tubes 77 and 78 are braced laterally by means of spacers 87 which connect the tubes to the reenforcing strip 86. The air inlet fitting 88 is mounted coaxially of the terminal connection fitting 76 and is fixed to the valve housing 79. The general scheme of operation is substantially the same as that previously described. Thus, air admitted through hose 89 passes through inlet fitting 88. The position of the valve plunger 90 then determines whether the air shall pass through tube 78 and spear tube 85 to retract the piston 83, or whether the air shall pass through tube 77 to advance the piston 83 within the cylinder 82.

The housing 79, valve plunger 90 and associated parts are proportioned so that maximum flow areas are provided. This results in a minimum of restriction to the passage of air and speeds up the rapidity of movement of the piston 83 within the cylinder 82. The housing 79 is provided with a central axial bore 91. The surface of the bore 91 is not continuous but is interrupted by a series of counter-bores which coincide with the location of each of the ports in the wall of the housing 79. Thus a counter-bore is provided for each of the two-way ports 92 and 93 communicating with the tubes 77 and 78. Similarly, a counter-bore is provided adjacent the air inlet port 94 and adjacent the vent ports 95 and 96.

The valve plunger 90 is provided with axially spaced annular grooves 97 and 98 for reception of the seal rings 99 and 100 respectively. These seal rings may be of any desired type and are preferably of circular cross-section and formed of natural or synthetic rubber. The rings have the same outside diameter and are adapted to engage the cylindrical bore 91 in sealing relationship. When the valve plunger 90 is in the position shown in Figure 7 air admitted through inlet fitting 88 passes through ports 94 and 93 into the tube 78. At the same time the tube 77 is vented through ports 92 and 95. When the valve plunger 90 is in the position shown in Figure 8 air admitted through the inlet fitting 88 passes through ports 94 and 92 into the tube 77 and at the same time the tube 78 is vented through ports 93 and 96. The vent ports 95 and 96 communicate with the atmosphere through the vent channels 101 provided in the handle 70.

The opposed ends of the valve housing 79 are provided with internal threads 102. A cap or closure 103 is threaded into one end of the bore 91 and an apertured closure or bushing 104 is threaded into the other end of the bore 91. The projecting portion 105 of the valve plunger 90 is slidably mounted within the bore 106 in the bushing 104. A seal ring 107 is provided in the bushing 104 to seal the projecting portion 105 of the plunger 90.

The plunger 90 is provided with a central opening 108 which terminates at a shoulder 109. A coil spring 110 is received within the opening 108 and rests against the shoulder 109. The other end of the spring 110 engages the enlarged end of a spacer element 111 which extends into the bore 108 in sliding relationship. The other end of the spacer 111 engages the cap 103. The spring 110 is thus operatively interposed between the cap 103 and the plunger 90 and serves to move the plunger 90 in a direction away from the cap 103. When the plunger 90 is moved in the direction to compress the spring 110 the parts take the position shown in Figure 8. If desired, a hardened button 112 may be mounted at the extreme outer end of the projecting portion 105 of the plunger 90.

The operating lever 113 is substantially the same shape as previously described and is pivotally connected to the handle 70 by means of the pivot pin 114. This lever 113 engages the button 112 on the projecting end 105 of the plunger 90. Movement of the plunger in one direction is arrested by contact of the shoulder 115 with the stop plate 116 and movement of the plunger in the other direction is arrested by engagement of the shoulder 117 with the underside of the cap 103.

Figure 6:
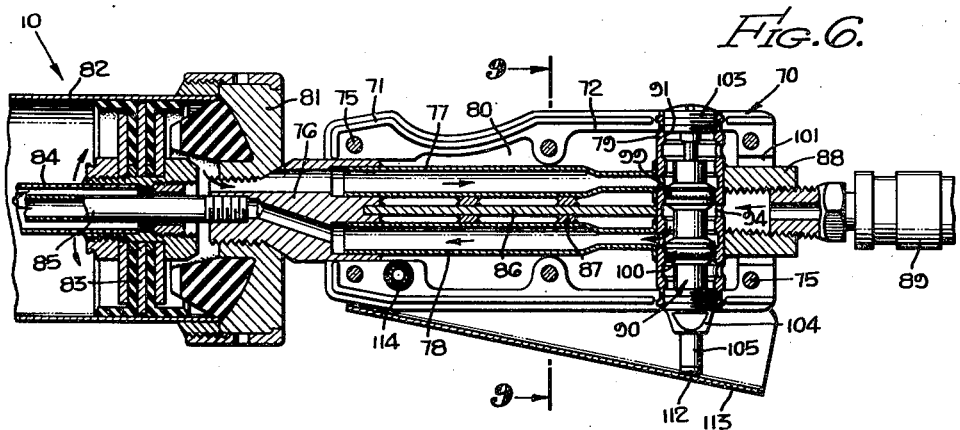
Figure 6 is a sectional elevation taken substantially on the line 6—6 as shown in Figure 5.
Figure 10:
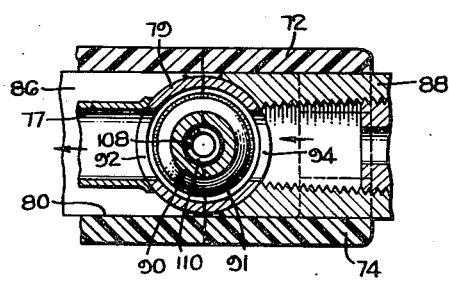
Figure 10 is a sectional detail taken substantially on the line 10—10 as shown in Figure 8.
Figure 7:
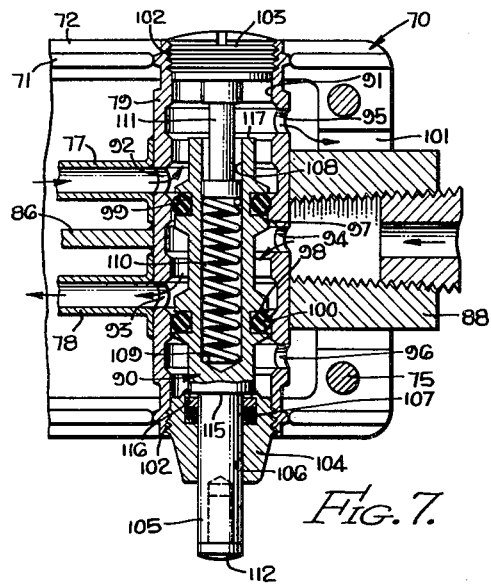
Figure 7 is an enlarged sectional view showing a portion of the device illustrated in Figure 6.
Figure 8:
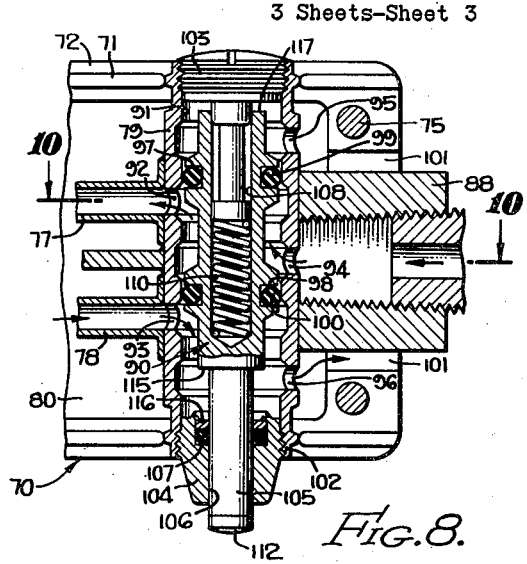
Figure 8 is a sectional view similar to Figure 7 showing the valve plunger shifted with respect to the valve housing.
Figure 11:
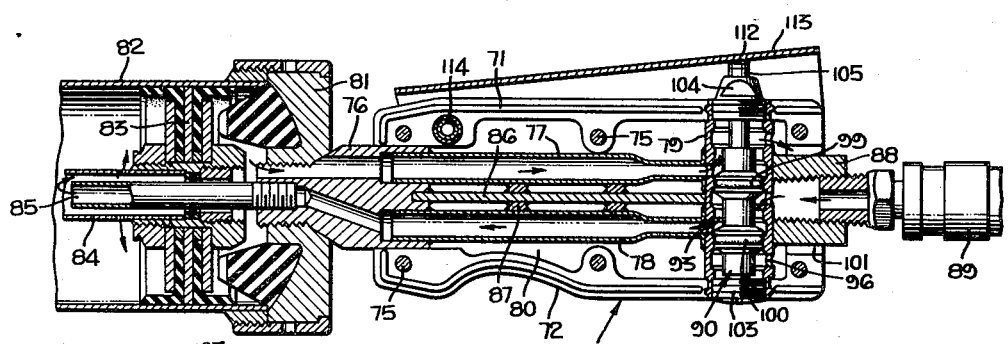
Figure 11 is a sectional elevation similar to Figure 6 but showing the movable valve parts and the shell assembled in reverse position.
Figure 9:
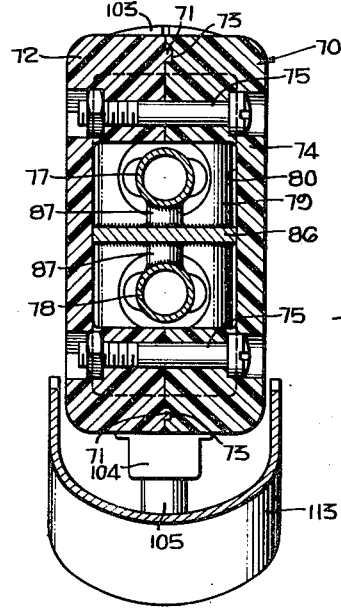
Figure 9 is a transverse sectional elevation taken substantially on the line 9—9 as shown in Figure 6.

When the parts of the valve are in the position shown in Figure 6 the piston 83 within the cylinder 82 remains at the rear end of the cylinder until the operating lever 113 is depressed. When the valve plunger is moved by depressing the lever 113, air pressure is admitted on the right side of the piston 83 as shown in Figure 6. The power stroke is thus a push stroke, with the hollow piston rod 84 moving forward when the valve operating lever 113 is depressed. If it is desired to have the piston 83 remain at rest in the forward end of the cylinder 82 until the valve is actuated, the moving parts of the valve are disassembled and the split handle is removed from the valve body. The parts are then reassembled as shown in Figure 11. The valve plunger 90, spring 110, spacer 111, bushing 104 and cap 103 are reversed in their positions with respect to the housing 79. The threads on the bushings 104 and 103 are received in either end of the housing. The two-way ports 92 and 93, as well as the vent ports 95 and 96, are symmetrically disposed with respect to a plane containing the axes of the fittings 76 and 88 and passing through the housing 79 midway between its ends. The split halves of the handle 70 are also reversed in order to bring the actuating lever 113 into position to engage the end of the valve plunger 90. When the parts are assembled in the manner shown in Figure 11 the piston 83 remains at the forward end of the cylinder 82 until the lever 113 is depressed.

Having fully described my invention, it is to be understood that I do not wish to be limited to the details herein set forth, but my invention is of the full scope of the appended claims.

I claim:

1. In a valve assembly, the combination of a split shell comprising a pair of halves cooperating to define an internal longitudinal cavity, a longitudinal valve body received in said cavity, the valve body having a housing extending transversely of the body and having a central bore, the housing having lateral ports in the wall thereof, a valve element movable axially in said bore to control flow of fluid through said ports, the valve body being symmetrical about a longitudinal plane so that the valve body may be received in said shell cavity in either of two positions, and a valve actuating lever pivoted on the shell and operable by manual squeezing pressure, the lever being engageable with the movable valve element to shift its position within the valve housing.

2. In a valve assembly, the combination of a split shell comprising a pair of halves cooperating to define an internal cavity, the outer surface of the shell being shaped to form a manually graspable handle, a valve body received in said cavity, the valve body having a terminal connection fitting at one end and a valve housing longitudinally spaced therefrom, the housing extending transversely of the handle and having a central bore, the housing having lateral ports in the wall thereof, means establishing communication between certain of the ports and said terminal connection fitting, a valve element movable axially in said bore to control flow of fluid through said ports, the valve body being symmetrical about a longitudinal plane so that the valve body may be received in said shell cavity in either of two positions, and a valve actuating lever pivoted on the shell near the terminal connection fitting and operable by manual squeezing pressure, the lever being engageable with the movable valve element to shift its position within the valve housing.

3. In a valve assembly, the combination of a split shell comprising a pair of halves cooperating to define an internal cavity, the outer surface of the shell being shaped to form a manually graspable handle, a valve body received in said cavity, the valve body having a terminal connection fitting at one end and a fluid pressure supply fitting at the other end, a valve housing adjacent the fluid pressure supply fitting, the housing extending transversely of the handle and having a central bore, the housing having lateral ports in the wall thereof, means establishing communication between certain of the ports and said fittings, a valve plunger movable axially in said bore to control flow of fluid through said ports, the valve body being symmetrical about a longitudinal plane so that the valve body may be received in said shell cavity in either of two positions, and a valve actuating lever pivoted on the shell near the terminal connection fitting and operable by manual squeezing pressure, the lever being engageable with the movable valve plunger to shift its position within the valve housing.

4. In a four-way valve assembly for controlling injection and exhaust of motive fluid from a power cylinder, the combination of: a body having a terminal connection fitting and a valve housing spaced therefrom and connected by a pair of conduits, the valve housing having a central bore, lateral ports in the valve housing each communicating with one of said conduits, additional ports in the housing for inlet and exhaust of fluid, a valve plunger slidably mounted for axial movement in said bore and provided with spaced sealing elements for controlling flow of fluid through said ports, a portion of the valve plunger projecting from one end of the bore, the valve plunger being insertable from either end of the housing bore so that the projecting portion may extend from either end as desired, a two part shell split longitudinally of the said conduits and having a central cavity to receive the body, the shell forming a manually graspable handle, a valve operating lever pivotally mounted on the shell, the split shell receiving the body in either of two positions so that the lever may engage the projecting portion of the valve plunger when it extends from either end of the housing.

5. In a four-way valve assembly for controlling injection and exhaust of motive fluid from a double-acting power cylinder, the combination of: a body having a threaded terminal connection fitting, the body having a valve housing and a pair of longitudinal tubes connecting the terminal fitting to the valve housing, the valve housing having a central transverse bore, lateral ports in the valve housing each communicating with one of said longitudinal tubes, additional ports in the housing for inlet and exhaust of fluid, a valve plunger slidably mounted in said bore for controlling flow of fluid through said ports, a portion of the valve plunger projecting from one end of the bore, a spring within the bore acting on the valve plunger in a direction to extend the projecting portion outwardly, the valve plunger and spring being insertable from either end of the housing bore so that the projecting portion may extend from either end as desired, a two part shell split longitudinally of the said tubes and having a central cavity to receive the body, the shell forming a manually graspable handle, a valve operating lever pivotally mounted on the shell, the split shell receiving the body in either of two positions so that the lever may engage the projecting portion of the valve plunger when it extends from either end of the housing.

References Cited in the file of this patent

UNITED STATES PATENTS

| | | |
|---|---|---|
| 430,689 | Rigg | June 24, 1892 |
| 861,805 | Camp | July 30, 1907 |
| 1,185,309 | Haeseler | May 30, 1916 |
| 1,572,509 | Schneider | Feb. 9, 1926 |
| 1,614,130 | Jimerson | Jan. 11, 1927 |
| 1,862,055 | Kehl | Jan. 7, 1932 |
| 1,936,236 | Hill | Nov. 21, 1933 |
| 2,016,878 | Vickers | Oct. 8, 1935 |
| 2,129,816 | Byars | Sept. 13, 1938 |
| 2,269,835 | Wallace | Jan. 13, 1942 |
| 2,374,593 | Ernst | Apr. 24, 1945 |
| 2,457,930 | Smith | Jan. 4, 1949 |